United States Patent
Ando et al.

(10) Patent No.: US 8,606,810 B2
(45) Date of Patent: Dec. 10, 2013

(54) INFORMATION ANALYZING DEVICE, INFORMATION ANALYZING METHOD, INFORMATION ANALYZING PROGRAM, AND SEARCH SYSTEM

(75) Inventors: Shinichi Ando, Tokyo (JP); Satoshi Nakazawa, Tokyo (JP); Toshio Takeda, Kanagawa (JP)

(73) Assignee: NEC Corporation, Tokyo (JP)

( * ) Notice: Subject to any disclaimer, the term of this patent is extended or adjusted under 35 U.S.C. 154(b) by 185 days.

(21) Appl. No.: 12/864,976

(22) PCT Filed: Jan. 30, 2009

(86) PCT No.: PCT/JP2009/051538
§ 371 (c)(1), (2), (4) Date: Jul. 28, 2010

(87) PCT Pub. No.: WO2009/096506
PCT Pub. Date: Aug. 6, 2009

(65) Prior Publication Data
US 2010/0312792 A1    Dec. 9, 2010

(30) Foreign Application Priority Data
Jan. 30, 2008 (JP) .................. 2008-019015

(51) Int. Cl.
*G06F 7/00* (2006.01)
*G06F 17/30* (2006.01)

(52) U.S. Cl.
USPC ........................................... 707/769

(58) Field of Classification Search
USPC ......... 707/602, 694, 706–710, 727–731, 737, 707/749–752, 755, 758, 770, 771, 780, 707/999.001–999.01, 999.1, 999.101, 707/999.107, 999.2–999.206
See application file for complete search history.

(56) References Cited

U.S. PATENT DOCUMENTS

| | | | |
|---|---|---|---|
| 2002/0198866 A1* | 12/2002 | Kraft et al. | 707/3 |
| 2004/0064438 A1* | 4/2004 | Kostoff | 707/1 |
| 2007/0219781 A1* | 9/2007 | Roche et al. | 704/9 |
| 2009/0089078 A1* | 4/2009 | Bursey | 705/1 |

FOREIGN PATENT DOCUMENTS

| | | | |
|---|---|---|---|
| JP | 2000163429 A | 6/2000 |
| JP | 2003157271 A | 5/2003 |
| JP | 2003316810 A | 11/2003 |
| JP | 2006048319 A | 2/2006 |
| JP | 2006092134 A | 4/2006 |
| JP | 2006227965 A | 8/2006 |

OTHER PUBLICATIONS

International Search Report for PCT/JP2009/051538 mailed Mar. 17, 2009.

(Continued)

*Primary Examiner* — Hosain Alam
*Assistant Examiner* — Reza Hosseini

(57) ABSTRACT

Provided are a related expression generation section that accepts an evaluation object expression, an linguistic expression to be evaluated, as input and generates a linguistic expression related to the evaluation object expression as a related expression; and a credibility calculation section that acquires the evaluation object expression and the related expression from a plurality of electronic documents along with time information and calculates credibility concerning the meaning of the evaluation object expression at a specific point in time by comparing the number of times that the acquired evaluation object expression appears and the number of times that the acquired related expression appears at the same time point.

25 Claims, 8 Drawing Sheets

(56) References Cited

OTHER PUBLICATIONS

H. Miyamori et al., "Evaluation Data and Prototype System WISDOM for Information Credibility Analysis", In Proc. of First International Symposium on Universal Communication, 2007, pp. 234-237.

T. Nanno et al., "Automatically Collecting and Monitoring Japanese Weblogs", Transactions of the Japanese Society for Artificial Intelligence, vol. 19, No. 6, 2004, pp. 511-520.

K. Matsui et al., "Knowledge Management", Joho Shori, vol. 47, No. 8, Information Processing, Aug. 15, 2008, pp. 893-899.

Y. Shimota, "A study of public opinion surveys using weblogs", IPSJ SIG Notes, IPSJ SIG Technical Reports, vol. 2006, No. 59, May 31, 2006, pp. 61-68.

Y. Shimota et al., "A study of the reputation extraction from weblogs", Dai 68 Kai (Heisei 18 Nen) Zenkoku Taikai Koen Ronbunshu (3) Database to Media Network, Information Processing Society of Japan, Mar. 7, 2006, pp. 3-191~3-192.

R. Tokuhisa, "The Relationship between Utterances and 'Involvement' in Conversational Dialogue", Dai 44 Kai Reports of the Meeting of Special Internet Group on Spoken Language Understanding and Dialogue Processing, The Japanese Society for Artificial Intelligence, SIG-SLUD-A501-03, Jun. 3, 2005; pp. 13-20.

K. Tateishi, "Opinion Information Retrieval from the Internet", IPSJ SIG Notes, Information Processing Society of Japan, vol. 2001, No. 69, Jul. 17, 2001, pp. 75-82.

* cited by examiner

FIG.4

| TIME INFORMATION | SENTENCE |
|---|---|
| 2004/10/13 | EVEN THOUGH PLUTO IS THE NINTH PLANET IN THE SOLAR SYSTEM |
| 2005/06/09 | PLUTO, A PLANET IN THE SOLAR SYSTEM |
| 2006/09/12 | IT IS CONCLUDED THAT PLUTO IS NOT A PLANET. |
| 2006/11/21 | THERE IS STILL A DEEP-ROOTED OPINION THAT PLUTO IS A PLANET. |
| 2007/04/05 | SINCE PLUTO IS NO LONGER A PLANET |
| ... | ... |

INFORMATION ANALYZING DEVICE, INFORMATION ANALYZING METHOD, INFORMATION ANALYZING PROGRAM, AND SEARCH SYSTEM

TECHNICAL FIELD

The present invention relates to an information analysis (analyzing) device, an information analysis (analyzing) method, an information analysis (analyzing) program and a search system for evaluating the credibility of information.

BACKGROUND ART

In recent years, a large amount of information has been circulating throughout the world via Web pages, electronic bulletin boards and the like on the Internet. Accordingly, it is becoming more difficult for an ordinary user to determine which pieces of information are reliable or not on the Internet.

For example, when one proposition, such as "green tea works well for cancer" or "Pluto is a planet," is picked up, a large amount of information about arguments for and against the proposition, including various articles, comments and opinions about the proposition, is circulating on the Internet. Therefore, a user can judge the credibility of the proposition by referring to a wide range of such information. However, the judgment may be biased by referring to only a part of the information. Meanwhile, in reality, it is extremely difficult for a user to go through all the information. In particular, the trend grows stronger as the credibility of the information changes with time.

For example, the credibility of the proposition that "Pluto is a planet" was changed in 2006, when the definition of what a planet is was changed. There is risk that the user's judgment may vary depending on when the information that the user refers to is posted.

The related technique for evaluating the credibility of information on the Internet is, for example, disclosed in NPL 1. According to the related technique disclosed in NPL 1, a large amount of Web documents including a specific proposition is classified by sender of document, approval or disapproval opinion of document, and meaning such as factual grounding before being presented, thereby helping a user judge the credibility concerning the proposition.

In many cases, time information, such as a date and time of creation or a date or time of sending, is added to articles, blogs, emails and the like on the Internet. There is a technique of extracting from information on the Internet documents including the proposition on which attention is focused, sorting the extracted documents by time information attached to each document, and presenting the time when the proposition on which attention is focused appears and the number of times that the proposition appears. For example, what is disclosed in NPL 2 is a method of extracting and displaying the time-series changes in the number of times that a specific topic word appears in the whole of collected blogs.

CITATION LIST

Patent Literature

{NPL 1} H. Miyamori, et. al., "Evaluation Data and Prototype System WISDOM for Information Credibility Analysis", In Proc. of First International Symposium on Universal Communication, pp. 234-237 (2007)

{NPL 2} Tomoyuki Nanno, Yasuhiro Suzuki, Toshiaki Fujiki, Manabu Okumura "Automatically Collecting and Monitoring Blogs," Transactions of the Japanese Society for Artificial Intelligence, Vol. 19, No. 6, pp. 511-520, 2004

SUMMARY OF INVENTION

Technical Problem

However, the problem is that even if the related technique disclosed in NPL 1 or NPL2 is used, it is impossible to appropriately evaluate the credibility of linguistic expressions to be analyzed at a specific point in time. The reason is that according to the related technique disclosed in NPL 1, the changes of credibility over time are basically not taken into account. Even when the related technique disclosed in NPL 2 of handling the changes over time is used, it is only possible to present the time-series changes concerning the number of times that a linguistic expression as an analyzation object appears. The time-series changes, such as increases or decreases in the number of times that the linguistic expression appears, does not necessarily reflect credibility.

For example, the following looks at the situation where a downward trend in the number of times that a linguistic expression corresponding to a given proposition appears is observed. In this case, even if the related technique disclosed in NPL 1 or NPL 2 is used, it is not possible to judge that the number of times that the linguistic expression appears is decreasing because of the denial of the proposition or that the proposition is less discussed because the proposition turns out to be a fact generally accepted by society.

There is a certain kind of proposition that turns out to be true only under a specific condition. However, it is impossible to capture the phenomenon of the proposition turning out to be true only under the specific condition just by observing the number of times that a linguistic expression as an analyzation object appears.

The exemplary object of the present invention is to provide an information analysis device, an information analysis method and an information analysis program that can appropriately evaluate the credibility of a linguistic expression as an analyzation object at a specific point in time.

Solution to Problem

According to the present invention, an exemplary information analysis device includes: a related expression generation section that accepts a evaluation object expression as input, the evaluation object expression being an linguistic expression to be evaluated, and generates a linguistic expression related to the evaluation object expression as a related expression; and a credibility calculation section that acquires the evaluation object expression and the related expression from a plurality of electronic documents along with time information and calculates credibility concerning the meaning of the evaluation object expression at a specific point in time by comparing the number of times that the acquired evaluation object expression appears and the number of times that the acquired related expression appears at the same time point.

According to the present invention, an exemplary information analysis method includes: accepting an evaluation object expression as input, the evaluation object expression being an linguistic expression to be evaluated, and generating a linguistic expression related to the evaluation object expression as a related expression; and acquiring the evaluation object expression and the related expression from a plurality of electronic documents along with time information and calculating credibility concerning the meaning of the evaluation object expression at a specific point in time by comparing the number of times that the acquired evaluation object expression appears and the number of times that the acquired related expression appears at the same time point during the same period.

According to the present invention, an exemplary information analysis program causes a computer to execute: a related expression generation process of accepting a evaluation object expression as input, the evaluation object expression being an linguistic expression to be evaluated, and generating a linguistic expression related to the evaluation object expression as a related expression; and a credibility calculation process of acquiring the evaluation object expression and the related expression from a plurality of electronic documents along with time information and calculating credibility concerning the meaning of the evaluation object expression at a specific point in time by comparing the number of times that the acquired evaluation object expression appears and the number of times that the acquired related expression appears at the same time point.

Advantageous Effects of Invention

According to the present invention, it is possible to appropriately evaluate the credibility of an evaluation object linguistic expression at a specific point in time.

BRIEF DESCRIPTION OF DRAWINGS

FIG. 4 An explanatory diagram illustrating an example of documents stored in a document storage section.

DESCRIPTION OF EMBODIMENTS

First Exemplary Embodiment

Hereinafter, an exemplary first embodiment of the present invention will be described with reference to the accompanying drawings. The present invention relates to an information analysis device that uses an information analysis method to evaluate the credibility of a linguistic expression as an analyzation object at a specific point in time.

In the present exemplary embodiment, the information analysis device includes a related expression generation section that accepts an evaluation object expression being an linguistic expression to be evaluated, as input and generates a linguistic expression related to the evaluation object expression as a related expression. The information analysis device also includes a credibility calculation section that acquires the evaluation object expression and the related expression from a plurality of documents (electronic documents) along with time information and calculates credibility concerning the meaning of the evaluation object expression at a specific point in time by comparing the number of times that the evaluation object expression appears and the number of times that the related expression appears at the same time point.

With the above configuration employed, the information analysis device calculates credibility by taking into account not only the number of times that the evaluation object expression as an expression to be analyzed appears at each point in time but also the number of times that the related expression, whose appearance correlates with the appearance of the evaluation object expression, appears at each point in time. Therefore, it is possible to appropriately evaluate the credibility of the linguistic expression at a specific point in time.

Figure 1:
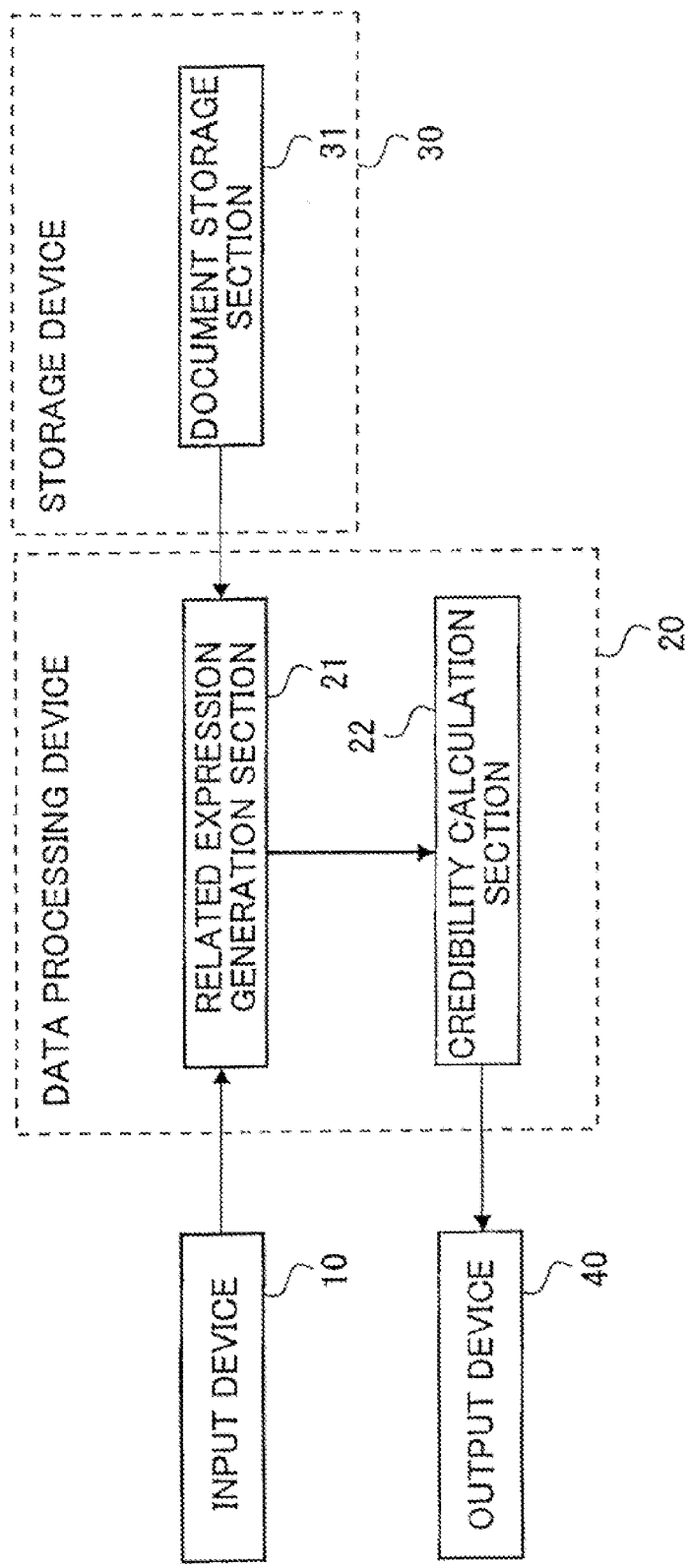
FIG. 1 A block diagram illustrating an example of an information analysis device according to the present invention.

FIG. 1 is a block diagram illustrating an example of the configuration of the information analysis device according to the first exemplary embodiment of the present invention. As shown in FIG. 1, the information analysis device includes an input device 10, a data processing device 20, a storage device 30 and an output device 40. According to the present exemplary embodiment, the information analysis device is made up of hardware such as a dedicated IC. However, as described in a second exemplary embodiment below, the functions of the information analysis device can be achieved by software with an information processing device such as a computer that runs in accordance with programs.

In the information analysis device illustrated in FIG. 1, the input device 10 is a device that accepts input from a user. More specifically, the input device 10 is realized by an input device such as a keyboard or mouse device. The storage device 30 is a device that stores various kinds of information. More specifically, the storage device 30 is realized by a storage medium such as a magnetic disk device or optical disk device. The output device 40 is a device that outputs the results of processing to a user. More specifically, the output device 40 is realized by an output device such as a display device or printer.

The storage device 30 includes a document storage section 31.

The document storage section 31 stores document data, such as articles or blogs on the Internet, along with time information. Suppose that, in an exemplary case, time information, such as a date and time of creation or a date and time of sending the document, is given to the document data on a per-document basis. The time information may be given to a specific portion of the document data. For example, the time information "Jan. 10, 2008" may be given to the linguistic expression portion "XX Corporation announced that . . . on Jan. 10, 2008" inside a given piece of document data. It is not necessary for the document storage section of the storage device to retain documents inside the information analysis device. As long as an access means for accessing the documents is provided, the real documents may be kept outside the information analysis device, not inside the information analysis device. For example, instead of the storage device, a blog search engine may be used to search blogs on the Internet with a keyword and date and time specified.

The data processing device 20 includes an related expression generation section 21 and a credibility calculation section 22.

The related expression generation section 21 is equipped with a function of accepting an evaluation object expression as a linguistic expression whose credibility is to be evaluated as a proposition, from the input device 10 as input. The related expression generation section 21 is also equipped with a function of generating, as an related expression, a linguistic expression related to the evaluation object expression input.

As related expressions, the following expressions can be used: a linguistic expression that is in conflict with the evaluation object expression input and a linguistic expression that is in co-occurrence with the evaluation object expression in the document stored in the document storage section 31.

Equipped with the above functions, the related expression generation section 21, for example, generates an expression whose meaning is in conflict with the evaluation object expression as a related expression. Moreover, the related expression generation section 21, for example, generates an expression in co-occurrence with the evaluation object expression as a related expression by referring to a plurality of electronic documents.

The credibility calculation section 22 is equipped with a function of acquiring (extracting) the search results that correspond to the evaluation object expression input and the related expression generated by the related expression generation section 21 from the document storage section 31 along with time information. The credibility calculation section 22 is also equipped with a function of comparing, based on the time information, the number of times that the evaluation object expression appears with the number of times that the related expression appears at the same time point to calculate the credibility of the evaluation object expression at a specific point in time concerning whether the meaning of the evaluation object expression is true or not.

Equipped with the above function, the credibility calculation section 22 acquires the evaluation object expression and the related expression from a plurality of electronic documents along with time information and compares the number of times that the acquired evaluation object expression appears with the number of times that the acquired related expression appears at the same time point to calculate credibility concerning the meaning of the evaluation object expression at a specific point in time.

A specific point in time at which credibility is calculated is, in an exemplary case, a current or previous point in time. However, if prediction or the like enables the number of times that the evaluation object expression appears and the number of times that the related expression appears to be obtained, a specific point in time may be a future point in time. The credibility calculation section 22, for example, calculates credibility based on the difference between the number of times that the evaluation object expression appears and the number of times that the related expression appears at each point in time or based on the difference between a change in the number of times that the evaluation object expression appears and a change in the number of times that the related expression appears at each point in time.

The credibility calculation section 22 is also equipped with a function of acquiring the evaluation object expression and the related expression from a plurality of electronic documents along with time information and comparing the trend of changes in the number of times that the acquired evaluation object expression appears and the trend of changes in the number of times that the acquired related expression appears at the same time point to make adjustments to the credibility of the evaluation object expression at a specific point in time.

For example, when an upward trend of the evaluation object expression and a downward trend of the related expression are observed at the same time point, the credibility calculation section 22 raises the credibility of the evaluation object expression for a time when the upward trend of the evaluation object expression and the downward trend of the related expression are observed at the same time point or for a time point after the observed time, thereby making adjustments to the credibility. For example, when a downward trend of the evaluation object expression and an upward trend of the related expression are observed at the same time point, the credibility calculation section 22 decreases the credibility of the evaluation object expression for a time when the downward trend of the evaluation object expression and the upward trend of the related expression are observed at the same time point or for a time point after the observed time, thereby making adjustments to the credibility.

The credibility calculation section 22 may be equipped with a function of making adjustments to the credibility of the evaluation object expression at each point in time in accordance with the ratio of the number of times that the evaluation object expression appears to the number of times that the related expression appears at each point in time. The credibility calculation section 22 may be equipped with a function of calculating the rate to which the author of the evaluation object expression is identical with the authors of the related expressions for the evaluation object expression and related expressions acquired from a plurality of electronic documents to make adjustments to the credibility of the evaluation object expression depending on the rate of how many calculated authors are identical. The credibility calculation section 22 may be equipped with a function of calculating the rate to which the source of the evaluation object expression is identical with the sources of the related expressions for the evaluation object expression and related expressions acquired from a plurality of electronic documents to make adjustments to the credibility of the evaluation object expression depending on the rate of how many calculated sources are identical.

Figure 2:
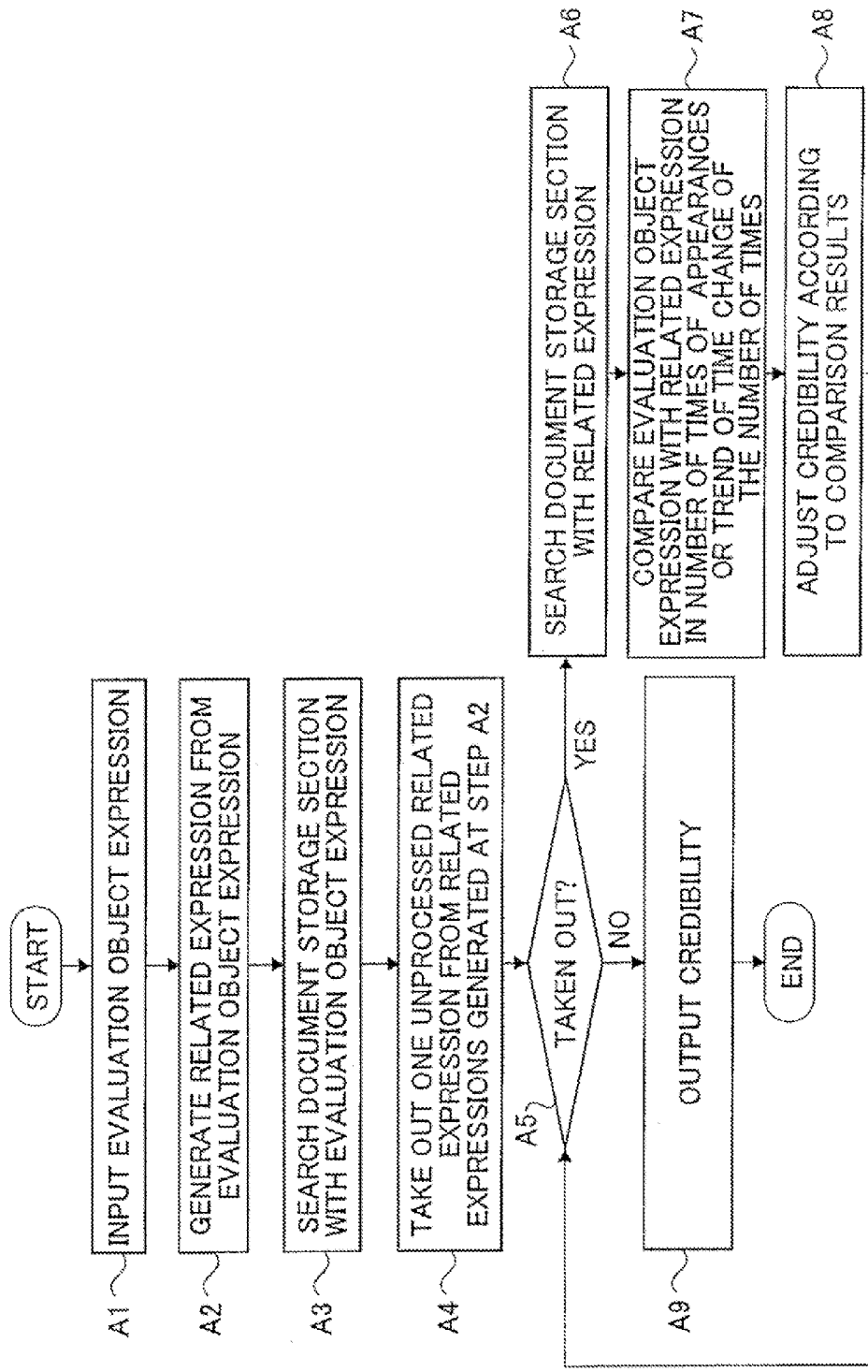
FIG. 2 A flowchart illustrating an example of a process for the information analysis device to analyze information.

The following describes operations; FIG. 2 is a flowchart illustrating an example of a process for the information analysis device to analyze information. The related expression generation section 21 accepts input of an evaluation object expression from the input device 10 (Step A1 in FIG. 2). For example, the related expression generation section 21 accepts the input of the evaluation object expression according to an operation performed by a user. The related expression generation section 21 may accept an evaluation object expression output from another device as input. Then, the related expression generation section 21 generates a linguistic expression related with the input evaluation object expression as a related expression (Step A2 in FIG. 2). Here, suppose that if it is possible to generate a plurality of related expressions, the related expression generation section 21 generates all the related expressions.

One of the related expressions generated by the related expression generation section 21 is a linguistic expression in conflict with the input evaluation object expression. In an exemplary case, the conflicting linguistic expression can be generated by adding a negative expression to the input evaluation object expression.

For example, if the evaluation object expression "green tea works well for cancer" is input, the related expression generation section 21 adds the negative expression "not" to the evaluation object expression and then makes adjustments, those common in the field of natural language generation technology or the like, to the conjugation. Therefore, it is possible to generate the conflicting linguistic expression "green tea does not work well for cancer" for the evaluation object expression. Moreover, the related expression generation section 21 may add the negative expression "not" to the linguistic expression "'A' is necessary" to generate the conflicting expression "'A' is not necessary." Making use of knowledge about linguistic expressions including the fact that the linguistic expression "necessary" is in conflict with the linguistic expression "unnecessary," the related expression generation section 21 may generate the conflicting expression "'A' is unnecessary."

The related expression generation section 21 may generate an expression that is likely to be in co-occurrence with the evaluation object expression as an related expression. When an linguistic expression that is likely to be in co-occurrence with the evaluation object expression is generated, the related expression generation section 21, in an exemplary case, searches documents stored in the document storage section 31 on the basis of the input evaluation object expression and extracts a proposition portion that appears near the evaluation object expression from among the obtained results of searching. Then, the related expression generation section 21 can generate the linguistic expression that is likely to be in co-occurrence with the evaluation object expression on the basis of the proposition portion extracted.

For example, suppose that the evaluation object expression "earthquake-proof gel is effective" is input and that the related expression generation section 21 finds a document including the linguistic expression "the use of earthquake-proof gel along with earthquake-resistant pole is effective in withstanding earthquakes" from the document storage section 31 on the basis of the input evaluation object expression. In this case, the related expression generation section 21 extracts the proposition portion "along with earthquake-resistant pole" that appears near the evaluation object expression in the result of searching. Then, the related expression generation section 21 makes adjustments, those common in the field of language generation technology or the like, to the conjugation to generate the linguistic expression "along with earthquake-resistant pole" that is in co-occurrence with the evaluation object expression.

Subsequently, the credibility calculation section 22 searches the document storage section 31 on the basis of the input evaluation object expression and acquires (extracts) the results of searching including the evaluation object expression along with time information (Step A3 in FIG. 2). Then, the credibility calculation section 22 selects one unprocessed related expression from among the related expressions generated at Step A2 as illustrated in FIG. 2 (Step A4 in FIG. 2).

The credibility calculation section 22 examines whether an unprocessed related expression is acquired (i.e. whether there is an unprocessed related expression) (Step A5 in FIG. 2). When it is determined that an unprocessed related expression is acquired, the credibility calculation section 22 searches the document storage section 31 on the basis of the related expression and acquires (extracts) the results of searching including the related expression along with time information (Step A6 in FIG. 2).

Moreover, the credibility calculation section 22 compares the evaluation object expression with related expression in number of times of appearances or in the trend of time change of the number of times of the appearances (Step A7 in FIG. 2). In accordance with the results of comparison, the credibility calculation section 22 calculates credibility at each point in time and adjusts the values of credibility (Step A8 in FIG. 2).

For example, the credibility calculation section 22 can calculate credibility at a given point in time by calculating the difference between the number of times that the evaluation object expression appears and the number of times that the related expression appears at the above point in time and normalizing the resultant value.

The larger the value of the credibility obtained in the above way, the more reliable the contents of the evaluation object expression. When the value of the credibility is below zero, the contents of the evaluation object expression is unreliable. When the value of the credibility is zero, it is not clear whether the contents of the evaluation object expression is reliable, which means that it is not possible to determine only with the documents stored in the document storage section 31.

The credibility calculation section 22 may adjust credibility at a given point in time by further calculating the difference between a change in the number of times that the evaluation object expression appears and a change in the number of times that the related expression appears at the above point in time and adding the value obtained by normalizing the value of the difference or by doing other things. Therefore, even if the credibility calculated from the difference between the number of times that the evaluation object expression appears and the number of times that the related expression appears has the same value, the credibility becomes larger when the evaluation object expression is on an upward trend, while the credibility becomes smaller when the evaluation object expression is on a downward trend. In particular, by comparing the upward/downward trends of the related expressions and measuring the upward/downward trends of the evaluation object expressions, the phenomenon of the evaluation object expressions increasing/decreasing due to the effects of all the related topics that are on the increase/decrease can be expected to be removed.

When an upward trend of the evaluation object expression and a downward trend of the related expression are observed at the same time point, the credibility calculation section 22 may adjust the credibility in a such way that the credibility of the evaluation object expression becomes larger after the above time point. Alternatively, when a downward trend of the evaluation object expression and a upward trend of the related expression are observed at the same time point, the credibility calculation section 22 may adjust the credibility in such a way that the credibility of the evaluation object expression becomes smaller after the above time point.

When a linguistic expression that is in co-occurrence with the input evaluation object expression is generated by the related expression generation section 21 as a related expression, the credibility calculation section 22 may adjust the credibility at a given point in time according to the ratio of the number of times that the evaluation object expression appears to the number of times that the related expression appears at the above point in time. For example, the credibility calculation section 22 makes adjustments in a way that decreases the credibility when the value of the ratio is large and increases the credibility when the value of the ratio is small.

The credibility calculation section 22 may be so configured as to consider that there is a strong correlation between the evaluation object expression and the related expression and increase the adjustable range of the credibility concerning the related expression when the author or source of the evaluation object expression is identical with the author or source of the related expression.

The credibility calculation section 22 then returns to step A5 in FIG. 2 to continue the process after adjusting credibility at each point in time. In this case, the credibility calculation section 22 repeatedly performs the processes of steps A6 to A8 until all the related expressions are processed.

When there is no unprocessed related expression (i.e. all the related expressions have been processed) at step A5 in FIG. 2, the credibility calculation section 22 makes the output device 4 output the calculated credibility (Step A9 in FIG. 2) before ending the process.

As for the way to output credibility, the credibility calculation section 22 may be so configured as to make the output device 4 output credibility at a point in time specified by a user or to make the output device 4 output the time-series changes of credibility for a given period of time in the form of a graph. The credibility calculation section 22 may be so configured as to present (for example, display) related information about what has caused credibility to change dramatically, instead of presenting credibility directly to a user.

As described above, according to the present exemplary embodiment, credibility is calculated by taking into account not only the number of times that the evaluation object expression to be analyzed appears at each point in time but also the number of times that the related expression, whose appearance correlates with the appearance of the evaluation object expression, appears at each point in time. Therefore, it is possible to appropriately evaluate the credibility of a linguistic expression as an analyzation object at a specific point in time.

Moreover, according to the present exemplary embodiment, instead of merely presenting credibility at a specific point in time to a user, the information analysis device may be so configured as to make a determination as to whether the evaluation object expression is reliable at each point in time using a predetermined threshold value and output the period of validity of the evaluation object expression.

Furthermore, according to the present exemplary embodiment, the information analysis device is so configured as to find the related expression that correlates closely with the evaluation object expression at each point in time and make adjustments to the credibility on the basis of the presence of the related expression or time-series changes. Therefore, the configuration enables related information about what has caused the credibility to change dramatically to be presented to a user when the credibility changes dramatically. Thanks to the above configuration, it is possible to help a user to determine credibility by offering appropriate information.

Second Exemplary Embodiment

Figure 3:
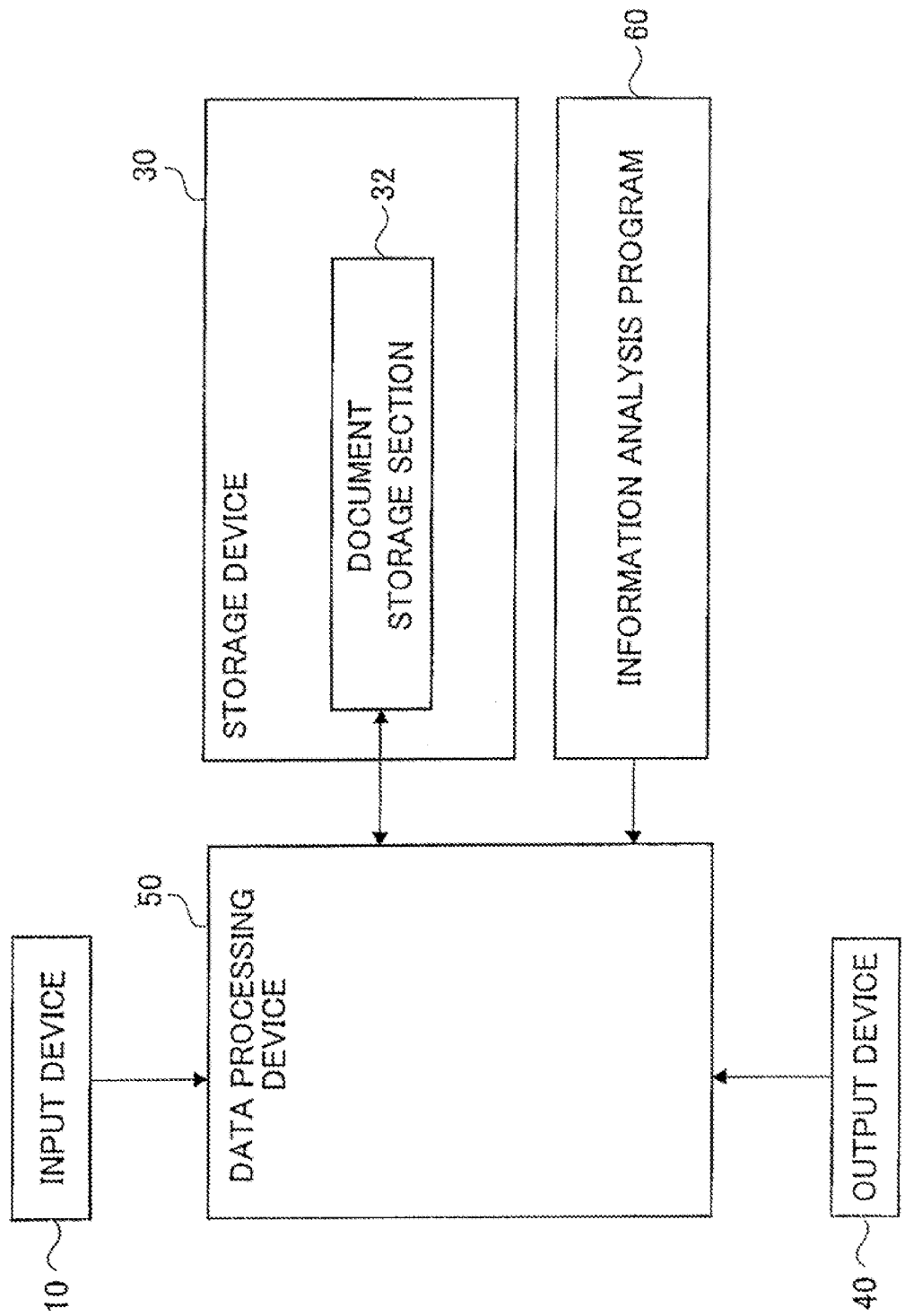
FIG. 3 A block diagram illustrating an example of the configuration of an information analysis device according to a second exemplary embodiment of the present invention.

Hereinafter, an exemplary second embodiment of the present invention will be described with reference to the accompanying drawings. FIG. 3 is a block diagram illustrating an example of the configuration of the information analysis device according to the second exemplary embodiment of the present invention. As shown in FIG. 3, according to the present exemplary embodiment, as in the first exemplary embodiment, the information analysis device includes the input device 10, a data processing device 50, the storage device 30 and the output device 40. The data processing device 50 is a device that operates while being controlled by programs and carries out various processes. More specifically, the data processing device 50 includes a memory in which programs are stored and a CPU that executes the programs.

Here, an information analysis program 60 is loaded into the data processing device 50 and controls the operation of the data processing device 50. The information analysis program 60 is also equipped with a function of generating a document storage section 32 in the storage device 30. Moreover, the data processing device 50 is equipped with a function of carrying out the same processes as the data processing device 20 of the first exemplary embodiment does under the control of the information analysis program 60.

Equipped with the above functions, the data processing device 50 of the present exemplary embodiment reads the information analysis program 60 stored in a computer-readable information recording medium, such as a flexible disk like FD (floppy disk), a CD-ROM, a DVD or a flash memory, and carries out processes in accordance with the information analysis program 60 that the data processing device 50 has read. For example, the data processing device 50 carries out processes by reading the information analysis program 60 that enables the following processes to be executed: a related expression generation process of accepting the evaluation object expression, a linguistic expression to be evaluated, as input and generating a linguistic expression related with the evaluation object expression as a related information and a credibility calculation process of calculating credibility concerning the meaning of the evaluation object expression at a specific point in time by acquiring the evaluation object expression and the related expression from a plurality of electronic documents along with time information and comparing the number of times that the acquired evaluation object expression appears and the number of times that the acquired related expression appears at the same time point.

EXAMPLE

The following describes an example of the present invention with reference to the accompanying drawings. Incidentally, an information analysis device shown in the present example corresponds to the information analysis device of the first exemplary embodiment. In the present example, the information analysis device includes a keyboard as the input device 10 as well as a central processing unit as the data processing device 20. The information analysis device is also equipped with a magnetic disc recording device as the storage section 30 as well as a display, such as a liquid crystal display, as the output device 40. A computer that runs in accordance with the information analysis program constitutes the information analysis device. The information analysis program may be stored in a portion of the storage device 30 or in a memory that the data processing device 20 has. If the information analysis device is a server connected to terminals through a network, the input device 10 and the output device 40 serve as a communication section to communicate with terminals and the keyboard and the display can be omitted.

The central processing unit that the data processing device 20 is equipped with functions as the related expression generation section 21 and the credibility calculation section 22. In the magnetic disc storage device, there is a storage area that functions as the document storage section 31.

FIG. 4 is an explanatory diagram illustrating an example of documents stored in the document storage section 31. Incidentally, in FIG. 4, the storage area that functions as the document storage section 31 is schematically illustrated in the form of a table. Each line represents one document stored in the document storage section 31. As shown in FIG. 4, each document and time information are linked to one another as a pair when being stored in the document storage section 31. In FIG. 4, the following pairs are stored in the document storage section 31: a pair of the time information "2004/10/13" and a document including "even though Pluto is the ninth planet in the solar system," a pair of the time information "2005/06/09" and a document including "Pluto, a planet in the solar system," a pair of the time information "2006/09/12" and a document including "it is concluded that Pluto is not a planet," a pair of the time information "2006/11/21" and a document including "there is still a deep-rooted opinion that Pluto is a planet," and a pair of the time information "2007/04/05" and a document including "since Pluto is no longer a planet."

For example, in the example illustrated in FIG. 4, the first line means that in the document storage section 31, a document including the expression "even though Pluto is the ninth planet in the solar system" sent on Oct. 13, 2004 is stored.

The following looks at the case in which the linguistic expression "Pluto is a planet" is input as an evaluation object expression.

The central processing unit accepts, in accordance with an operation performed by a user, the linguistic expression "Pluto is a planet" as an evaluation object expression (which is input through the keyboard). The central processing unit then generates a related expression related to the evaluation object expression on the basis of the input evaluation object expression. For example, assume that a linguistic expression in conflict with the evaluation object expression will be generated as a related expression. In this case, the central processing unit adds the negative expression "not" to the linguistic expression "Pluto is a planet" and makes adjustments to the conjugation to generate the related expression "Pluto is not a planet."

The central processing unit then searches the document storage section 31 on the basis of the evaluation object expression "Pluto is a planet" (with the key "Pluto is a planet"). Subsequently, the central processing unit takes out the related expression "Pluto is not a planet" as an unprocessed related expression and searches the document storage section 31 on the basis of the related expression (with the key "Pluto is not a planet").

For a search method, the central processing unit may adopt a method capable of acquiring a wide range of expressions with the same meaning and the like, which are those expressing the same contents in terms of meaning, to search the document storage section 31, instead of extracting only an expression that is exactly identical with the evaluation object expression or related expression simply as a character string. For example, the central processing unit may adopt a method capable of acquiring a wide range of synonymous expressions (expressions with the same meaning) and the like, which are those expressing the same contents in terms of meaning, including expressions that are the same in sentence structure as the evaluation object expression or related expression and expressions created by replacing part of the evaluation object expression or related expression with a synonym.

Figure 5:
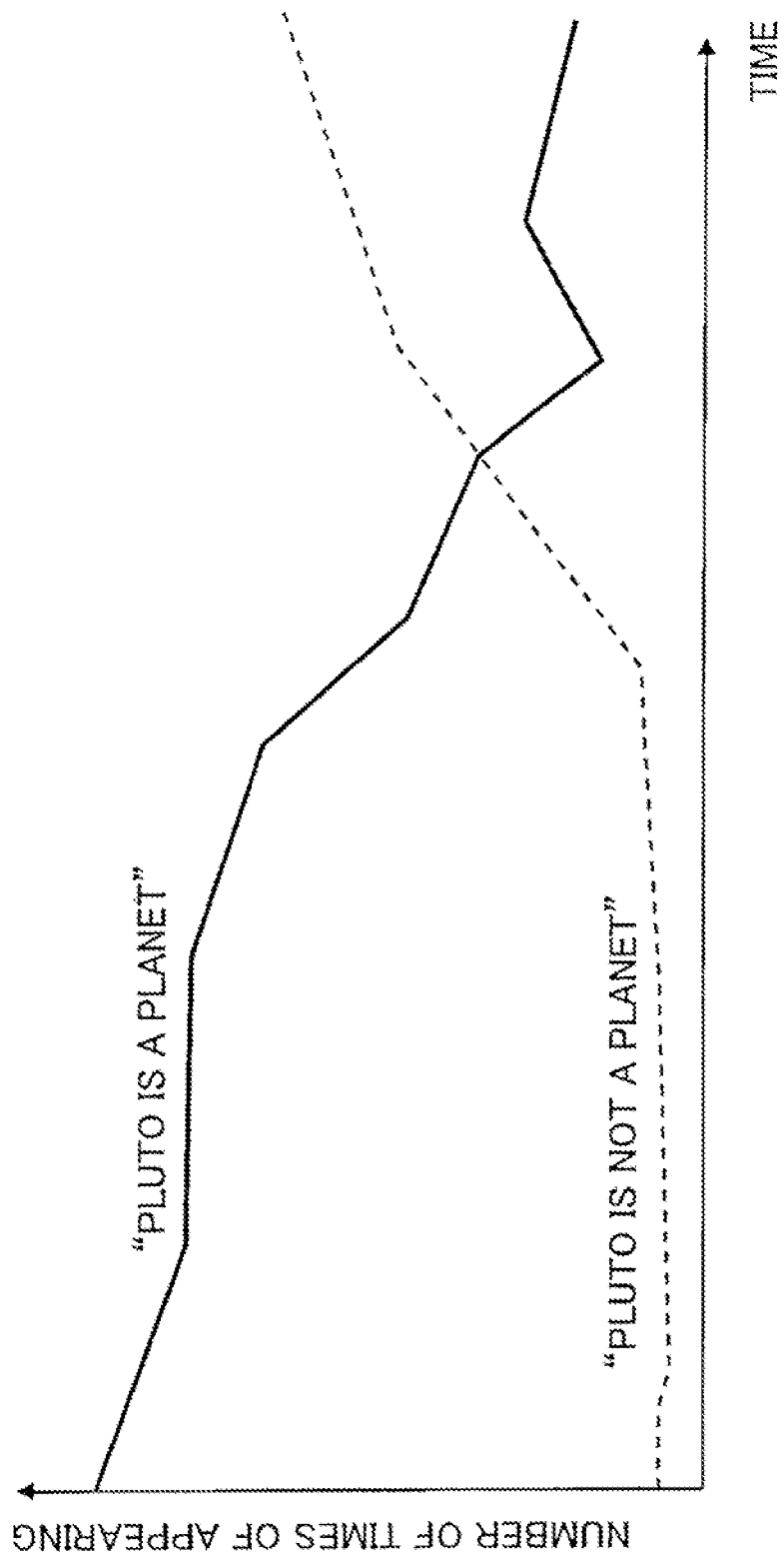
FIG. 5 An explanatory diagram illustrating an example of the result of plotting the results of searching the document storage section in chronological order.

FIG. 5 is an explanatory diagram illustrating an example of the result of plotting the results of searching the document storage section 31 in chronological order on the basis of the evaluation object expression "Pluto is a planet" and the related expression "Pluto is not a planet." In the example illustrated in FIG. 5, the vertical axis represents the number of times that the linguistic expressions appear; the horizontal axis represents time. The solid-line graph represents the search results of the evaluation object expression "Pluto is a planet"; the dashed-line graph represents the search results of the related expression "Pluto is not a planet."

Moreover, for the search results of the evaluation object expression and the related expression, the central processing unit compares the evaluation object expression with the related expression in the number of times of appearances or the trends of the time changes of the number of times of appearances and calculates credibility. For example, the central processing unit can calculate the credibility of the evaluation object expression using the formula "$f(t)=\alpha(t)\times((\text{the number of times that the evaluation object expression appears})-(\text{the number of times that the related expression appears}))$. Here, $\alpha(t)$ is a function for outputting a coefficient for normalization at each point "t" in time.

Moreover, the central processing unit can adjust the credibility of the evaluation object expression using the formula "$g(t)=\beta(t)\times((\text{the change in the number of times that the evaluation object expression appears})-(\text{the change in the number of times that the related expression appears}))$. Here, $\beta(t)$ is a function for outputting a coefficient for normalization at each point "t" in time. In this case, the central processing unit can calculate the adjusted credibility by calculating the weighted sum of f(t) and g(t) or the like.

Furthermore, if expressions whose authors or sources are the same are found after the search results of the evaluation object expression and the related expression are compared, the central processing unit may adjust the credibility according to the ratio in the search results. For example, what the central processing unit applies to each of the above formulas may be the number of times that the related expression appears multiplied by a value greater than or equal to 1 as the number of times that the related expression appearances, depending on the rate of how many authors or sources are identical in the search results. In this case, the credibility is calculated on the assumption that the related expression has appeared a lot more times.

The following looks the case in which the linguistic expression "earthquake-proof gel is effective" is input as an evaluation object expression.

The central processing unit accepts, in accordance with an operation performed by a user, the linguistic expression "earthquake-proof gel is effective" as an evaluation object expression (which is input through the keyboard). The central processing unit then generates a related expression related with the evaluation object expression on the basis of the input evaluation object expression. For example, suppose that an expression that is likely to be in co-occurrence with the evaluation object expression will be generated as a related expression.

The central processing unit then searches the document storage section 31 on the basis of the evaluation object expression "earthquake-proof gel is effective" (with the key "earthquake-proof gel is effective"). If a document including the linguistic expression "the use of earthquake-proof gel along with earthquake-resistant pole is effective in withstanding earthquakes" is found, the central processing device extracts the proposition portion "along with earthquake-resistant pole" that appears near the evaluation object expression in the search results. The central processing unit then makes adjustments of the conjugation, which is generally carried out in the field of language generation technology or the like, to the extracted proposition portion and generates the linguistic expression "along with earthquake-resistant pole" that is in co-occurrence with the evaluation object expression.

Then, in the same way as described above, the central processing unit searches the document storage section 31 on the basis of the evaluation object expression "earthquake-proof gel is effective". Subsequently, by performing the same process as in the example illustrated in FIG. 5, the central processing unit takes out the related expression "along with earthquake-resistant pole" as an unprocessed related expression and searches the document storage section 31 on the basis of the related expression (with the key "along with earthquake-resistant pole").

Figure 6:
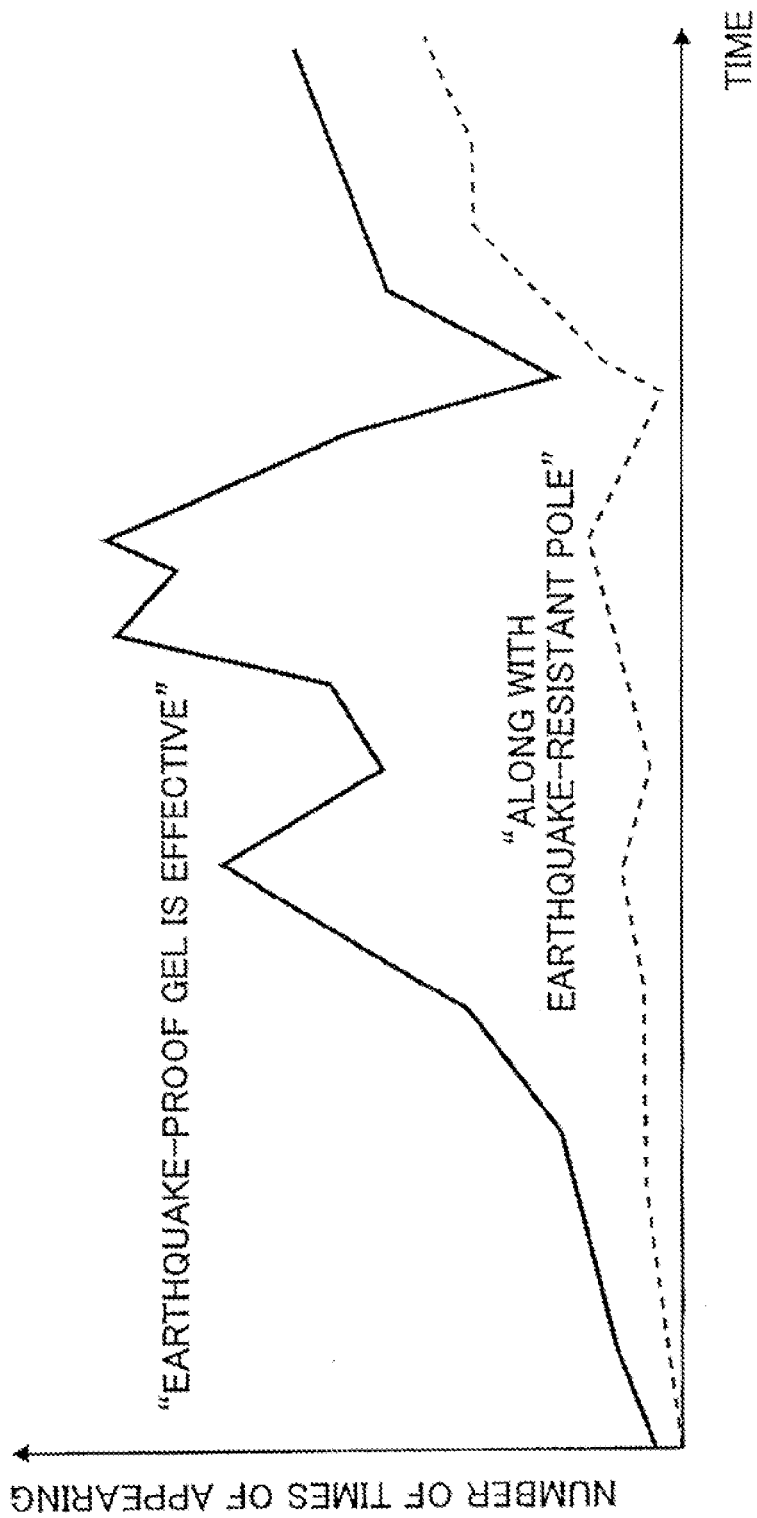
FIG. 6 An explanatory diagram illustrating another example of the result of plotting the results of searching the document storage section in chronological order.

FIG. 6 is an explanatory diagram illustrating an example of the result of plotting the results of searching the document storage section 31 in chronological order on the basis of the evaluation object expression "earthquake-proof gel is effective" and the related expression "along with earthquake-resistant pole." In the example illustrated in FIG. 6, the vertical axis represents the number of times that the linguistic expressions appear; the horizontal axis represents time. The solid-line graph represents the search results of the evaluation object expression "earthquake-proof gel is effective"; the dashed-line graph represents the search results of the related expression "along with earthquake-resistant pole."

Moreover, in the same way as in the example illustrated in FIG. 5, for the search results of the evaluation object expression and the related expression, the central processing unit compares the evaluation object expression with the related expression in the number of times of appearances or the trends of the time changes of the number of times of appearances and calculates credibility.

Incidentally, when an expression that is likely to be in conjunction with the evaluation object expression is used as a related expression, the central processing unit may calculate, in particular, the ratio of the number of times that the evaluation object expression appears to the number of times that the related expression appears and make adjustments to the credibility according to the value of the ratio. For example, when the value of the ratio of the number of times that the evaluation object expression appears to the number of times that the related expression appears is greater than or equal to a predetermined threshold value, the central processing unit may calculate credibility after replacing the number of times that the related expression appears with a larger value. When the value of the ratio is less than or equal to a predetermined threshold value, the central processing unit may calculate credibility after replacing the number of times that the related expression appears with a smaller value.

As described above, according to the present exemplary embodiment, the central processing unit takes into account not only the number of times that the evaluation object expression, to be analyzed appears at each point in time but also the number of times the related expression, whose appearance correlates with the appearance of the evaluation object expression, appears at each point in time when calculating credibility. Therefore, it is possible to appropriately evaluate the credibility of a linguistic expression as an analyzation object at a specific point in time.

Figure 7:
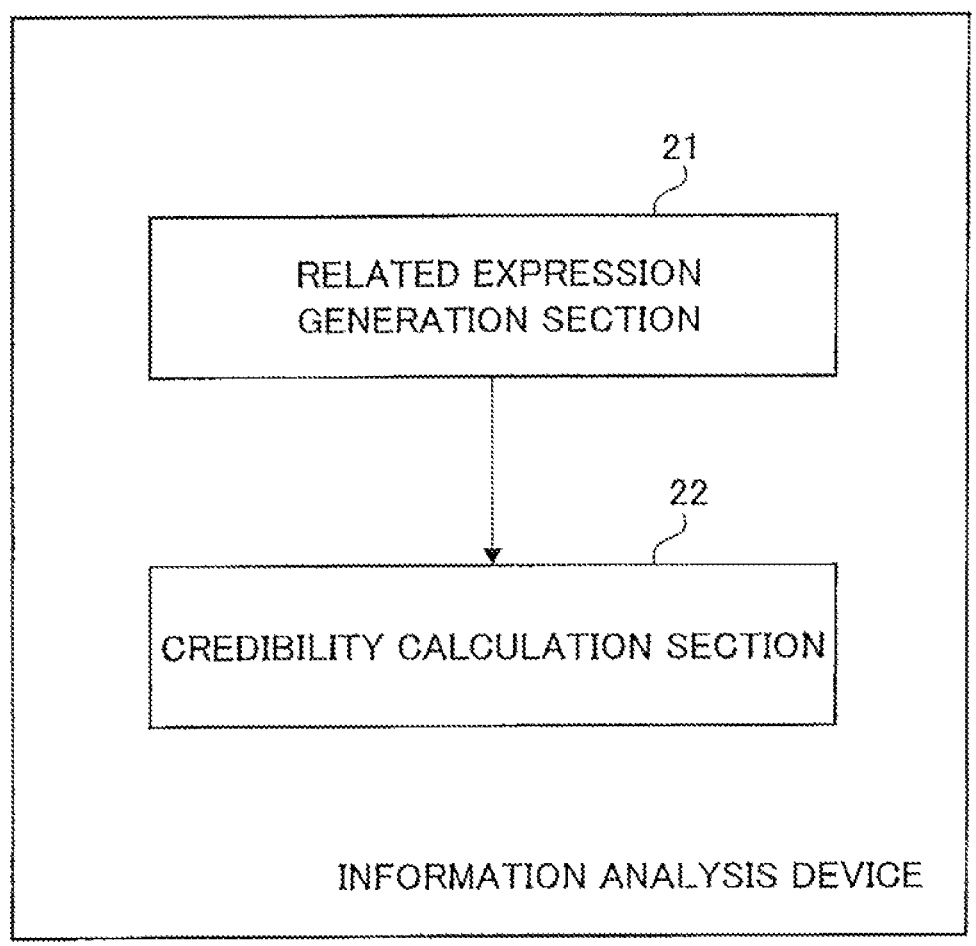
FIG. 7 A block diagram illustrating an example of the minimum configuration of an information analysis device.

The following describes the minimum configuration of an information analysis device according to the present invention. FIG. 7 is a block diagram illustrating an example of the minimum configuration of the information analysis device. As shown in FIG. 7, the information analysis device includes the related expression generation section 21 and the credibility calculation section 22 as components of the minimum configuration.

In the information analysis device having the minimum configuration as illustrated in FIG. 7, the related expression generation section 21 is equipped with a function of accepting an evaluation object expression, an linguistic expression to be evaluated, as input and generating a linguistic expression related with the evaluation object expression as a related expression. The credibility calculation section 22 is equipped with a function of acquiring the evaluation object expression and the related expression from a plurality of electronic documents along with time information and calculating credibility concerning the meaning of the evaluation object expression at a specific point in time by comparing the number of times that the acquired evaluation object expression appears and the number of times that the acquired related expression appears at the same time point.

The information analysis device having the minimum configuration as illustrated in FIG. 7 takes into account not only the number of times that the evaluation object expression to be analyzed appears at each point in time but also the number of times that the related expression, whose appearance correlates with the appearance of the evaluation object expression, appears at each point in time when calculating credibility. Therefore, it is possible to appropriately evaluate the credibility of a linguistic expression as an analyzation object at a specific point in time.

The information analysis device of each of the above exemplary embodiments can be applied for the use of a search system that presents, as a search condition, an expression that is input through the information analysis device and considered to be highly reliable.

Figure 8:
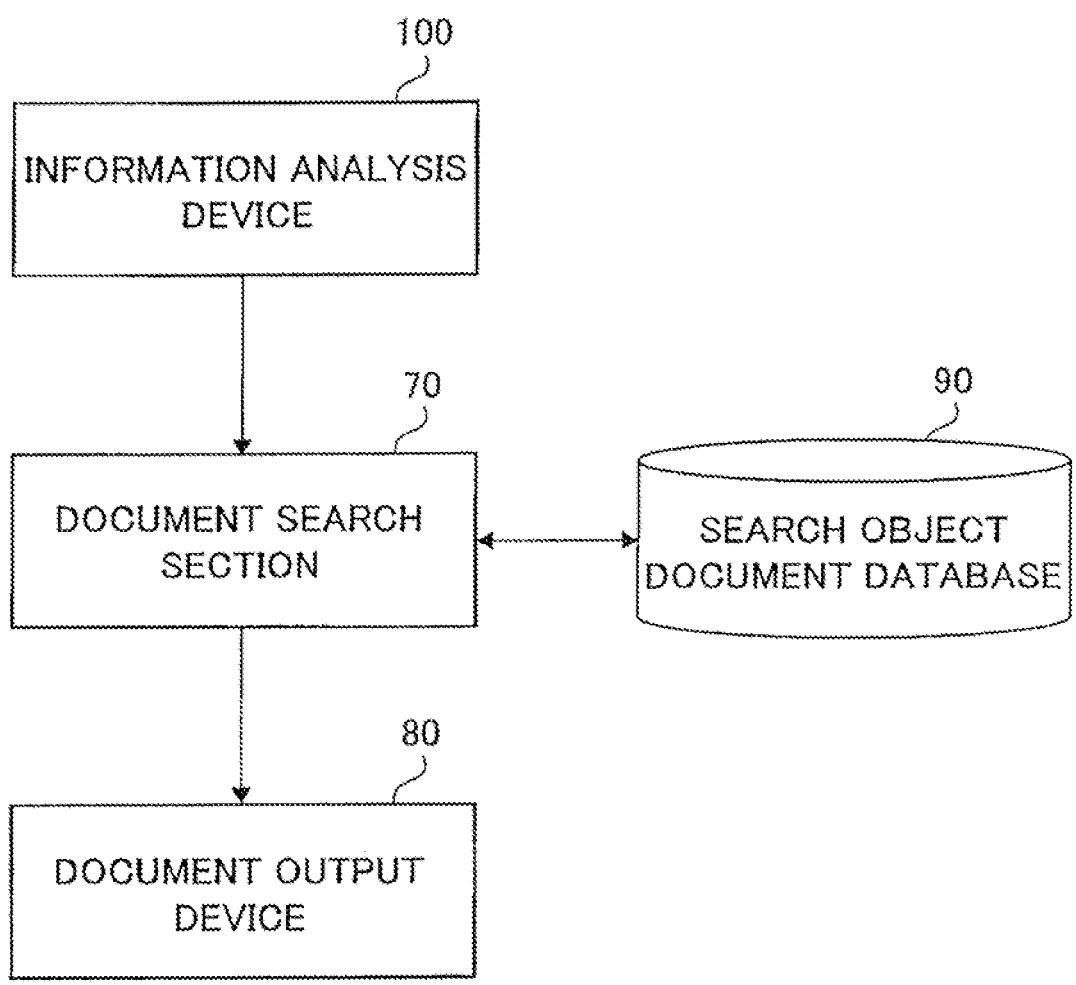
FIG. 8 A block diagram illustrating the configuration of a search system according to the present invention.

FIG. 8 is a block diagram illustrating the configuration of a search system according to the present invention. The search system illustrated in FIG. 8 includes an information analysis device 100, a document search section 70, a document output device 80, and a search object document database 90. The information analysis device 100 is the information analysis device of the first exemplary embodiment illustrated in FIG. 1. Instead of the information analysis device illustrated in FIG. 1, the information analysis device illustrated in FIG. 3 may be used.

The document search section 70 receives, as a search condition, a highly reliable expression output from the information analysis device 100 and searches a plurality of documents that can be accessed by the search object document database 90 for a document containing the received expression. The document output device 80 outputs a document found by the document search section 70. The search object document database 90 is a database that enables a search object collection of documents to be accessed. The search object document database 90 may be formed as a database that offers access to a collection of documents such as Internet texts. A collection of documents to be searched may be stored in the search object document database 90. Alternatively, only an access means, such as URL, for accessing each document may be provided, with documents themselves being stored outside.

The above has described the exemplary embodiments of the present invention. However, the present invention may be embodied in other forms without departing from the spirit and essential characteristics defined by the appended claims. The described embodiments are therefore to be considered only as illustrative, not as restrictive. The scope of the invention is indicated by the appended claims, not by the specification or the abstract. Furthermore, all modifications and alterations which come within the meaning and range of equivalency of the claims are to be embraced within the scope of the present invention.

The present application claims priority from Japanese Patent Application No. 2008-019015 filed on Jan. 30, 2008, the entire contents of which being incorporated herein by reference.

INDUSTRIAL APPLICABILITY

The present invention can be applied for the use of an information analysis device that evaluates the credibility of an input proposition using information on the Internet. Moreover, the present invention can be applied for the use of a program that realizes the information analysis device with a computer.

REFERENCE SIGNS LIST

10: Input device
20, 50: Data processing device
30: Storage device
40: Output device
60: Information analysis program
21: Related expression generation section
22: Credibility calculation section
31, 32: Document storage section

The invention claimed is:

1. An information analysis device comprising:
a related expression generation section that accepts an evaluation object expression as input, the evaluation object expression being an linguistic expression to be evaluated, and generates a linguistic expression related to the evaluation object expression as a related expression; and
a credibility calculation section that acquires occurrences of the evaluation object expression together with first time information indicating a time correlated to the occurrences of the evaluation object expression and occurrences of the related expression together with second time information indicating a time correlated to the occurrences of the related expression from a plurality of electronic documents and calculates credibility concerning the meaning of the evaluation object expression at a specific point in time at least on the basis of a first frequency that the acquired evaluation object expression appears in a term including the specific point of time and a second frequency that the acquired related expression appears in the same term including the same specific point of time,
wherein the first frequency is obtained from pieces of said first time information, each of which is correlated to each of the occurrences of the evaluation object expression, and the second frequency is obtained from pieces of said second time information, each of which is correlated to each of the occurrences of the related expression.

2. The information analysis device according to claim 1, wherein
the credibility calculation section acquires the evaluation object expression together with first time information indicating a time correlated to the occurrences of the evaluation object expression and the related expression together with second time information indicating a time correlated to the occurrences of the related expression from a plurality of electronic documents and make adjustments to the credibility of the evaluation object expression at a specific point in time by comparing a trend along time regarding said first frequency a trend along time regarding said second frequency.

3. The information analysis device according to claim 2, wherein:
when an upward trend along time of the evaluation object expression and a downward trend along time of the related expression are observed at the same time point, the credibility calculation section raises the credibility of the evaluation object expression for a time when the upward trend of the evaluation object expression and the downward trend along time of the related expression are observed at the same time point or for a time point thereafter; and
when a downward trend of the evaluation object expression and an upward trend along time of the related expression are observed at the same time point, the credibility calculation section decreases the credibility of the evaluation object expression for a time when the downward trend of the evaluation object expression and the upward trend along time of the related expression are observed at the same time point or for a time point thereafter.

4. The information analysis device according to claim 1, wherein
the related expression generation section generates, as an related expression, an expression whose meaning is in conflict with the evaluation object expression.

5. The information analysis device according to claim 1, wherein
the related expression generation section generates, as a related expression, an expression that is in co-occurrence with the evaluation object expression by referring to the plurality of electronic documents.

6. The information analysis device according to claim 5, wherein
the credibility calculation section makes adjustments to the credibility of the evaluation object expression at each point in time in accordance with a ratio of said first frequency to said second frequency.

7. The information analysis device according to claim 1, wherein
the credibility calculation section calculates a rate of which an author of the evaluation object expression is identical with authors of the related expressions, for the evaluation object expression and related expressions acquired from the plurality of electronic documents, and makes adjustments to the credibility of the evaluation object expression depending on the rate of how many calculated authors are identical.

8. The information analysis device according to claim 1, wherein
the credibility calculation section calculates the rate of which a source of the evaluation object expression is identical with sources of the related expressions, for the evaluation object expression and related expressions acquired from the plurality of electronic documents, and makes adjustments to the credibility of the evaluation object expression depending on the rate of how many calculated sources are identical.

9. A search system comprising:
an information analysis device including a related expression generation section that accepts an evaluation object expression as input, the evaluation object expression being an linguistic expression to be evaluated, and generates a linguistic expression related to the evaluation object expression as a related expression; and a credibility calculation section that acquires occurrences of the evaluation object expression together with first time information indicating a time correlated to occurrences of the evaluation object expression and occurrences of the related expression together with second time information indicating a time correlated to the occurrences of the related expression from a plurality of electronic documents and calculates credibility concerning the meaning of the evaluation object expression at a specific point in time at least on the basis of a first frequency that the acquired evaluation object expression appears in a term including the specific point of time and a second frequency that the acquired related expression appears in the same term including the same specific point of time, wherein the first frequency is obtained from pieces of said first time information, each of which is correlated to each of the occurrences of the evaluation object expression, and the second frequency is obtained from pieces of said second time information, each of which is correlated to each of the occurrence of the related expression;
a document search section that uses, as a search condition, a highly reliable expression output from the information analysis device to search a document containing the expression from a plurality of search object documents for; and
a document output section that outputs the document found by the document search section.

10. An information analysis method comprising:
a step of accepting an evaluation object expression as input, the evaluation object expression being an linguistic expression to be evaluated, and generating a linguistic expression related to the evaluation object expression as a related expression; and
a step of acquiring occurrences of the evaluation object expression together with first time information indicating a time correlated to occurrences of the evaluation object expression and occurrences of the related expression together with second time information indicating a time correlated to occurrences of the related expression from a plurality of electronic documents and calculating credibility concerning the meaning of the evaluation object expression at a specific point in time at least on the basis of a first frequency that the acquired evaluation object expression appears in a term including the specific point of time and a second frequency that the acquired related expression appears in the same term including the same specific point of time,
wherein the first frequency is obtained from pieces of said first time information each of which is correlated to each of the occurrences of the evaluation object expression, and the second frequency is obtained from pieces of said second time information, each of which is correlated to each of the occurrences of the related expression.

11. The information analysis method according to claim 10, wherein
the calculating of the credibility involves acquiring the evaluation object expression together with first time information indicating a time correlated to occurrences of the evaluation object expression and the related expression together with second time information indicating a time correlated to occurrences of the related expression from a plurality of electronic documents, and making adjustments to the credibility of the evaluation object expression at a specific point in time by comparing a trend along time regarding said first frequency and the trend along time in said second frequency.

12. The information analysis method according to claim 11, wherein:
the calculating of the credibility involves, when an upward trend along time of the evaluation object expression and a downward trend along time of the related expression are observed at the same time point, raising the credibility of the evaluation object expression for a time when the upward trend along time of the evaluation object expression and the downward trend along time of the related expression are observed at the same time point or for thereafter; and
the calculating of the credibility involves, when a downward trend along time of the evaluation object expression and an upward trend along time of the related expression are observed at the same time point, decreasing the credibility of the evaluation object expression for a time when the downward trend of the evaluation object expression and the upward trend along time of the related expression are observed at the same time point or for a time point thereafter.

13. The information analysis method according to claim 10, wherein
the generating of the related expression involves generating, as a related expression, an expression whose meaning is in conflict with the evaluation object expression.

14. The information analysis method according to claim 10, wherein the generating of the related expression involves generating, as a related expression, an expression that is in co-occurrence with the evaluation object expression by referring to the plurality of electronic documents.

15. The information analysis method according to claim 14, wherein
the calculating of the credibility involves making adjustments to the credibility of the evaluation object expression at each point in time in accordance with a ratio of said first frequency to said second frequency.

16. The information analysis method according to claim 10, wherein
the calculating of the credibility involves calculating a rate to which an author of the evaluation object expression is identical with authors of the related expressions, for the evaluation object expression and related expressions acquired from the plurality of electronic documents, and making adjustments to the credibility of the evaluation object expression depending on the rate of how many calculated authors are identical.

17. The information analysis method according to claim 10, wherein
the calculating of the credibility involves calculating the rate of which a source of the evaluation object expression is identical with sources of the related expressions, for the evaluation object expression and related expressions acquired from the plurality of electronic documents, and making adjustments to the credibility of the evaluation object expression depending on the rate of how many calculated sources are identical.

18. A non-transitory computer-readable medium storing an information analysis program for causing a computer to execute:
a related expression generation process of accepting an evaluation object expression as input, the evaluation object expression being an linguistic expression to be evaluated, and generating a linguistic expression related to the evaluation object expression as a related expression; and
a credibility calculation process of acquiring occurrences of the evaluation object expression together with first time information indicating a time correlated to the occurrences of the evaluation object expression and occurrences of the related expression together with second time information indicating a time correlated to the occurrences of the related expression from a plurality of electronic documents and
calculating credibility concerning the meaning of the evaluation object expression at a specific point in time at least on the basis of a first frequency that the acquired evaluation object expression appears in a term including the specific point of time and a second frequency that the acquired related expression appears in the same term including the same specific point of time,
wherein the first frequency is obtained from pieces of said first time information, each of which is correlated to each of the acquisitions of the evaluation object expression, and the second frequency is obtained from pieces of said second time information, each of which is correlated to each of the occurrences of the related expression.

19. The non-transitory computer-readable medium according to claim 18, the program causing a computer to execute, in the credibility calculation process,
a process of acquiring the evaluation object expression and the related expression together with first time information indicating a time correlated to the occurrences of the evaluation object expression and the related expression together with second time information indicating a time correlated to the occurrence of the related expression from a plurality of electronic documents and make adjustments to the credibility of the evaluation object expression at a specific point in time by comparing a trend along time regarding said first frequency and a trend along time regarding said second frequency.

20. The non-transitory computer-readable medium according to claim 19, the program causing a computer to execute, in the credibility calculation process:

a process of raising, when an upward trend along time of the evaluation object expression and a downward trend along time of the related expression are observed at the same time point, the credibility of the evaluation object expression for a time when the upward trend along time of the evaluation object expression and the downward trend along time of the related expression are observed at the same time point or for a time point thereafter; and a process of decreasing, when a downward trend of the evaluation object expression and an upward trend along time of the related expression are observed at the same time point, the credibility of the evaluation object expression for a time when the downward trend along time of the evaluation object expression and the upward trend along time of the related expression are observed at the same time point or for a time point thereafter.

21. The non-transitory computer-readable medium according to claim 18, the program causing a computer to execute, in the related expression generation process, a process of generating, as a related expression, an expression whose meaning is in conflict with the evaluation object expression.

22. The non-transitory computer-readable medium according to claim 18, the program causing a computer to execute, in the related expression generation process, a process of generating, as a related expression, an expression that is in co-occurrence with the evaluation object expression by referring to the plurality of electronic documents.

23. The non-transitory computer-readable medium according to claim 22, the program causing a computer to execute, in the credibility calculation process, a process of making adjustments to the credibility of the evaluation object expression at each point in time in accordance with a ratio of said first frequency to said second frequency.

24. The non-transitory computer-readable medium according to claim 18, the program causing a computer to execute, in the credibility calculation process, a process of calculating a rate of which an author of the evaluation object expression is identical with authors of the related expressions, for the evaluation object expression and related expressions acquired from the plurality of electronic documents, and making adjustments to the credibility of the evaluation object expression depending on the rate of how many calculated authors are identical.

25. The non-transitory computer-readable medium according to claim 18, the program causing a computer to execute, in the credibility calculation process, a process of calculating the rate of which a source of the evaluation object expression is identical with sources of the related expressions, for the evaluation object expression and related expressions acquired from the plurality of electronic documents, and making adjustments to the credibility of the evaluation object expression depending on the rate of how many calculated sources are identical.

* * * * *